No. 744,189. PATENTED NOV. 17, 1903.
A. GILLIES.
TEAT CUP FOR PNEUMATIC MILKING APPARATUS.
APPLICATION FILED JUNE 17, 1903.
NO MODEL.

Witnesses
Walker C. Hart.
William G. Holden

Inventor
Alexander Gillies
by
Edw Waters + Son.
Attorneys

No. 744,189. Patented November 17, 1903.

UNITED STATES PATENT OFFICE.

ALEXANDER GILLIES, OF TERANG, VICTORIA, AUSTRALIA.

TEAT-CUP FOR PNEUMATIC MILKING APPARATUS.

SPECIFICATION forming part of Letters Patent No. 744,189, dated November 17, 1903.

Application filed June 17, 1903. Serial No. 161,941. (No model.)

*To all whom it may concern:*

Be it known that I, ALEXANDER GILLIES, dairyman, a subject of the King of Great Britain, residing at Terang, in the State of Victoria and Commonwealth of Australia, have invented Improved Means for Pulsating Inflatable Teat-Cups of Pneumatic Milking Apparatus, of which the following is a specification.

This invention relates to pneumatic milking apparatus and has been devised to overcome the necessity of having a "pulsator" at each milk receiver or bucket. I am aware that attempts have been made to achieve this object in various ways, but none have yet been found practicable.

According to this invention I utilize the atmospheric pressure at the teat-cup as one of the operating factors in causing pulsations, which in principle alone is not new, but which in conjunction with an intermittent suction in the annular space between the flexible lining and rigid casing of the teat-cup and a continuous suction in the interior chamber thereof constitutes the essence of my invention, which is carried out as hereinafter more particularly described with reference to the accompanying drawings, whereof—

Figure 1:
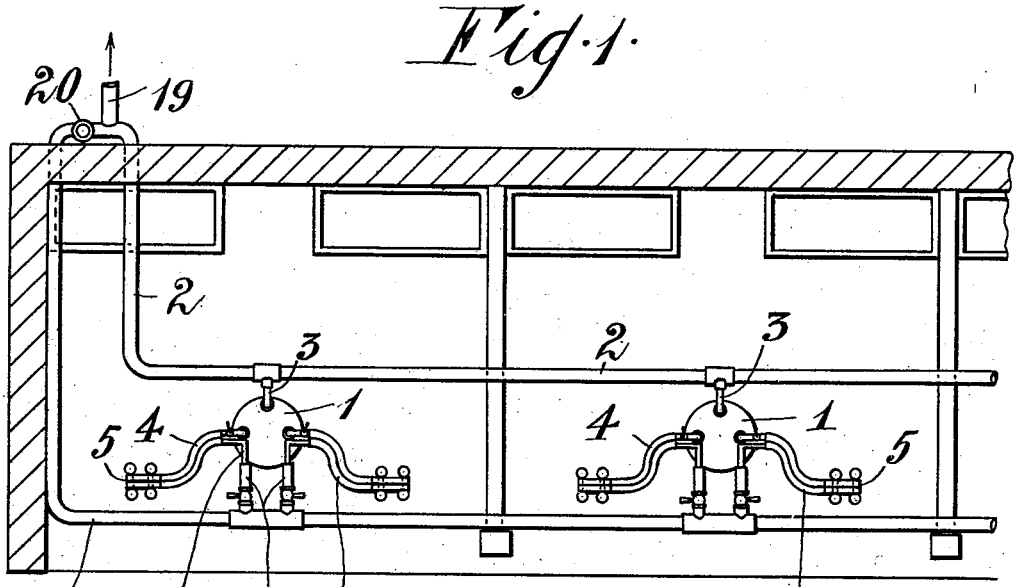
Figure 2:
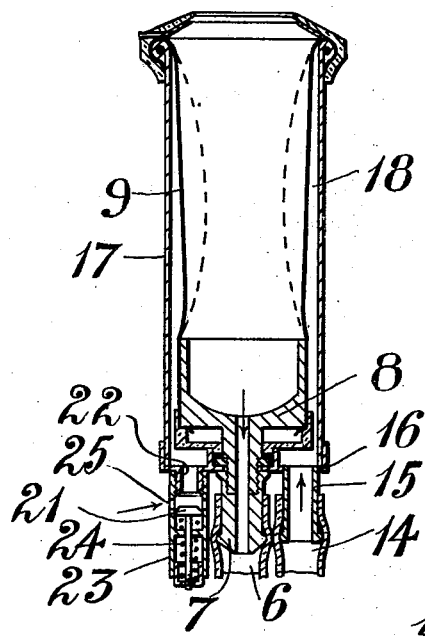

Figure 1 is a diagrammatic plan of part of a milking-shed, illustrating the general arrangement; and Fig. 2 is an enlarged vertical section of one of the teat-cups.

1 represents the lid of the milk receiver or bucket, and 2 the main continuous suction-pipe in communication with the receivers by branch pipes 3, while 4 denotes the milk-tubes leading from the "claw" or double bracket 5 to the bucket. The milk-passage of the claw is connected to the teat-cups by branch pipes 6, Fig. 2, attached to the ferrule 7 on the base 8 of the flexible inner lining 9 of each teat-cup. Thus a continuous suction is maintained in the milk-passage.

The main intermittent suction-pipe 10 has branch pipes 11, attached to elbow-pieces 12 on the lid 1 of the receiver, from whence the tubes 13 extend to the claw or double bracket 5, the intermittent suction-passage of which is connected by branch pipes 14, Fig. 2, to a nipple 15 on the base 16 of the outer rigid casing 17 of the teat-cups, so that intermittent suction is produced within the annular space 18 between the inner flexible lining 9 and the said outer rigid casing 17.

Both main suction-pipes 2 and 10, which may be conveniently secured to the roof of the cow-shed, are in communication and have a common "vacuum-supply" through pipe 19. Any convenient device may be employed for intermittently closing and opening a valve 20 in the pipe 10, said device being operated either by the vacuum or external power so long as a steady motion is obtained.

The base of the rigid casing of each teat-cup is provided with an automatic air-inlet valve 21, screwed to a nipple 22 on same and admitting atmospheric pressure when open to the annular space 18 between the lining 9 and casing 17. The valve 21 is held open in its casing 23, as shown in Fig. 2, by the spring 24; but when the suction is applied to the annular space in the teat-cups by opening the valve 20 in the intermittent suction-pipe 10 the valve 21 is drawn or forced up against a seating on the end of the nipple 22, thereby closing the apertures 25 in the valve-casing 23.

Although only one form of automatic air-inlet valve is shown in the drawings, I do not confine myself to this particular kind, as any suitable automatic valve will answer the purpose so long as it cuts off the atmospheric pressure when the intermittent suction is turned on and admits it when same is cut off.

In operation it will be observed that there is a continuous suction in the milk-passage 4 from the base 8 of the inner chamber of the teat-cups and that there is an intermittent (not pulsating) suction (by the action of the valve 20) from the annular space 18 between the lining and outer rigid casing. When this intermittent suction is applied, the inner lining is drawn back from the cow's teat and the air-inlet valve 21 is closed; but on cutting off this suction by reversing the valve 20 the air-inlet valve 21 opens and atmospheric pressure is admitted in the annular space between the casing and lining, so that the latter is distended inwardly, as shown in dotted lines in Fig. 2, against the teat, thus simulating, as nearly as possible, the action of the calf's mouth. By this combination pulsations are applied to the teat-cup as the valve 20 on the intermittent main suction-pipe 10 is operated.

It will be obvious that with the two main suction-pipes in communication with a vacuum-supply any number of receivers or buckets may be readily connected thereto, and thus many cows may be milked at a time, with the great advantage of doing away with pulsating currents in the tubes and the necessity of a pulsator for each pair of cows, which is in practice found necessary, as it is practically impossible to carry pulsations any considerable distance.

Having now particularly described and ascertained the nature of my said invention and in what manner the same is to be performed, I declare that what I claim is—

1. The combination with a teat-cup consisting of a rigid casing having a flexible lining, of an automatic air-inlet valve opening in the space between the lining and the casing, an intermittent suction-pipe at the base of said space, and a continuous suction-pipe at the base of the inner compartment of the teat-cup, substantially as set forth.

2. The combination with a teat-cup consisting of a rigid casing having a flexible lining forming thereby an annular space, of a vertically-extending automatic air-inlet valve arranged at the base of said annular space.

In testimony whereof I have hereunto set my hand in presence of two subscribing witnesses.

ALEXANDER GILLIES.

Witnesses:
   EDWARD WATERS,
   EDWARD WATERS, Jr.